United States Patent [19]

Tanigawa et al.

[11] Patent Number: 4,516,652
[45] Date of Patent: May 14, 1985

[54] APPARATUS FOR CONTROLLING THE SPEED OF AN AUTOMOBILE

[75] Inventors: Kou Tanigawa, Akashi; Jiro Masuda, Kobe; Kazumasa Nakamura, Okazaki; Kazuhiko Hayashi, Toyota, all of Japan

[73] Assignees: Fujitsu Ten Limited, Kobe; Toyota Jidosha Kabushiki Kaisha, Toyota, both of Japan

[21] Appl. No.: 451,839

[22] Filed: Dec. 21, 1982

[30] Foreign Application Priority Data

Dec. 21, 1981 [JP] Japan .................................. 56-207563
Dec. 26, 1981 [JP] Japan .................................. 56-214983
Jan. 25, 1982 [JP] Japan .................................. 57-10637

[51] Int. Cl.$^3$ .............................................. B60K 31/00
[52] U.S. Cl. ........................................ 180/177; 74/866
[58] Field of Search ................... 180/177, 178, 179; 123/352, 353, 354; 74/336 R, 866

[56] References Cited

U.S. PATENT DOCUMENTS 4,117,903 10/1978 Fleischer et al. .................. 180/179
4,133,406  1/1979 Allerdist ............................ 180/179
4,421,192 12/1983 Ito et al. ............................ 180/179
4,463,822  8/1984 Tanigawa et al. .................. 180/177

OTHER PUBLICATIONS

"Cruise Control System (Auto-Drive)" by Kou Tanigawa et al, (an article in the periodical Fujitsu, vol. 30, No. 5, 1979, published by Fujitsu Ltd.).

Primary Examiner—Joseph F. Peters, Jr.
Assistant Examiner—Michael Mar
Attorney, Agent, or Firm—Cushman, Darby & Cushman

[57] ABSTRACT

Apparatus for controlling the speed of an automobile in which the speed is maintained at a preset speed when a resume switch is manipulated. A memory stores data corresponding to the preset speed. The difference between the preset speed and the actual speed of the automobile is detected and this difference is employed to switch the reduction ratio of transmission gears of the automobile. The reduction ratio is increased when the actual speed becomes a predetermined speed less than the preset speed and when a predetermined condition is established. The predetermined condition is, for example, a condition in which the actual speed is less than the predetermined speed, the actual degree of acceleration is less than the predetermined degree of acceleration, or a predetermined time period elapses after the resume switch is manipulated.

24 Claims, 11 Drawing Figures

APPARATUS FOR CONTROLLING THE SPEED OF AN AUTOMOBILE

BACKGROUND OF THE INVENTION (1.) Field of the Invention

The present invention relates to an apparatus for controlling the speed of an automobile, which apparatus automatically adjusts the speed of the automobile to a preset speed.

(2.) Description of the Prior Art

An apparatus for adjusting the speed of an automobile so that the automobile runs at a constant speed so works that when a desired speed is preset, the degree of opening of the throttle is automatically controlled so that the car constantly runs at the preset speed and thereby, liberates the driver from the task of depressing the accelerator. However, when an automobile provided with such an apparatus is running on an uphill grade, the speed may often gradually decrease despite the fact that the throttle valve is wide. Therefore, the apparatus is equipped with a function which shifts the gears from fourth into third and then back into fourth when the speed reaches the preset speed.

Figure 1:
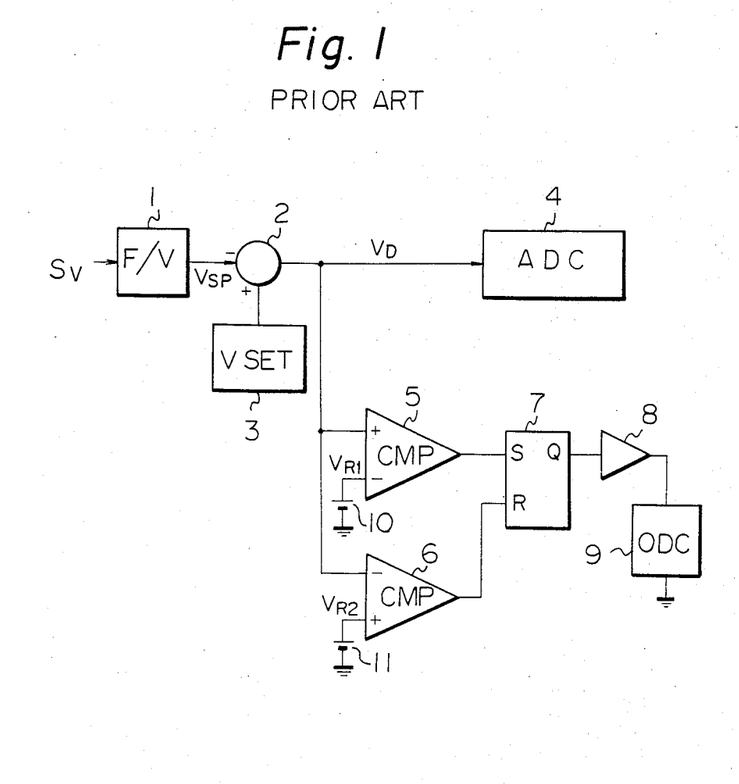
FIG. 1 is a schematic block circuit diagram illustrating a conventional apparatus for controlling the speed of an automobile.

FIG. 1 is a block diagram illustrating major portions of a conventional apparatus for adjusting the speed of an automobile so that the automobile runs at a constant speed. The signal $S_V$ is a signal having a frequency proportional to the speed of the automobile and is converted by a frequency-to-voltage converter 1 into voltages $V_{SP}$ which are proportional to the speed of the automobile and which are supplied to a subtraction circuit 2. Further, when a desired speed is preset by a speed-setting switch (not shown), a speed-setting unit 3 produces a voltage proportional to the preset speed, and the subtraction circuit 2 generates a differential voltage $V_D$ proportional to the difference between the voltage of the preset speed and the voltage of the actual speed.

The automatic drive control circuit 4 so controls the degree of opening of the throttle valve (not shown) and the like that the differential voltage $V_D$ becomes zero, with the result that the automobile runs at the preset speed. A comparator 5 compares a reference voltage $V_{R1}$, generated by a reference voltage source 10, corresponding to a difference in speed of 10 Km/h with the differential voltage $V_D$ generated by the subtraction circuit 2 and sets a flip-flop circuit 7 when difference in voltage is large, i.e., when the speed of the automobile is 10 Km/h less than the preset speed. A comparator 6 compares a reference voltage $V_{R2}$, generated by a reference voltage source 11, corresponding to a difference in speed of 4 Km/h with the differential voltage $V_D$ generated by the subtraction circuit 2 and resets the flip-flop circuit 7 when the difference in voltage is small, i.e., when the speed of the automobile approaches the preset speed; in other words, when the speed of the automobile is 4 Km/h less than the preset speed.

The output from the flip-flop circuit 7 is amplified by an amplifier 8 and is supplied to an overdrive-cutting solenoid 9 to energize the overdrive-cutting solenoid 9. The overdrive-cutting solenoid 9 shifts gears from overdrive, e.g., from fourth into third when it is energized. When an automobile is in overdrive, the rotation speed of the engine shaft is less than that of the propeller shaft.

In the circuit of FIG. 1, when the speed of the automobile becomes 10 Km/h less than the preset speed, the flip-flop circuit 7 is set, the solenoid 9 is energized to cut the overdrive, and the transmission gears are shifted from fourth into third. Therefore, when, for example, the automobile is running on an uphill grade, the acceleration is increased. Further, when the speed becomes 4 Km/h less than the preset speed, the flip-flop circuit 7 is reset, the overdrive-cutting solenoid 9 is de-energized, and overdrive is resumed.

In the system of FIG. 1, it is possible to switch the automobile from manual to automatic drive by turning on a resume switch (not shown) which initiates operation of the automatic drive control circuit 4, the overdrive-cutting solenoid 9, and so on. On the other hand, switching from automatic drive to manual is automatically effected by operating the brake, the clutch, and so on.

However, the above-mentioned conventional automatic drive system has the following disadvantages:

1. When the automobile is running at a high speed, for example, at a speed greater than 135 Km/h, shifting the gears from fourth into third to keep the speed constant may result in extremely increased engine revolution, giving rise to problems such as an increase in engine temperature and a decrease in the durability of the engine.

2. When the automobile has an automatic transmission and is being driven manually in fourth gear at a speed less than the set point speed, if the driver removes his foot from the accelerator and manipulates the resume switch to cut the overdrive, usually the gears are shifted from fourth to third with the throttle valve being closed. Therefore, the engine brake is applied since the gears are not shifted out of third; i.e., the automobile is first decelerated for a short time and then accelerated, causing a feeling of discomfort on the part of the driver and passengers.

3. When the above-mentioned cutting of the overdrive is effected under certain circumstances, for example, if the automobile is running on a downhill grade, if the output of the internal-combustion engine is large, or if the reactive force of the link coupled to the throttle valve is weak, the degree of acceleration is very great, thereby frightening the driver and passengers.

SUMMARY OF THE INVENTION

It is an object of the present invention to provide an apparatus for controlling the speed of an automobile in which cutting of the overdrive is effected only in predetermined conditions, thereby preventing the above-mentioned problems of the conventional apparatus.

It is another object of the present invention to prevent the speed of the engine from being excessively increased by inhibiting release of the overdrive when the automobile is running at a high speed.

It is still another object of the present invention to provide an apparatus for controlling the speed of an automobile, which apparatus makes it possible to smoothly accelerate the engine without deceleration occurring when the resume switch is manipulated.

It is still another object of the present invention to provide an apparatus for controlling the speed of an automobile in which the overdrive is cut only when the degree of acceleration is less than the predetermined value, thereby preventing too much acceleration.

According to the present invention, there is provided an apparatus for controlling the speed of an automobile so that it conforms with a preset speed when a resume switch is manipulated, the apparatus comprising: a speed-detecting means for generating a signal representing the actual speed of the automobile; a memory means for storing data corresponding to the preset speed; a speed-difference detecting means for detecting the difference between the preset speed and the actual speed of the automobile on the basis of the signal generated by the speed-detecting means and the data stored in the memory means; a switching means for switching the reduction ratio of the gears on the basis of an output signal generated by the speed-difference detecting means; and a gating means for transferring the output signal generated by the speed-difference detecting means to the switching means, the switching means decreasing the reduction ratio when the actual speed approaches the preset speed and increasing the reduction ratio when the actual speed becomes a predetermined speed less than preset speed and when a predetermined condition of the automobile is established.

DESCRIPTION OF THE PREFERRED EMBODIMENTS

The embodiments of the present invention will be explained with reference to the attached drawings.

Figure 2:
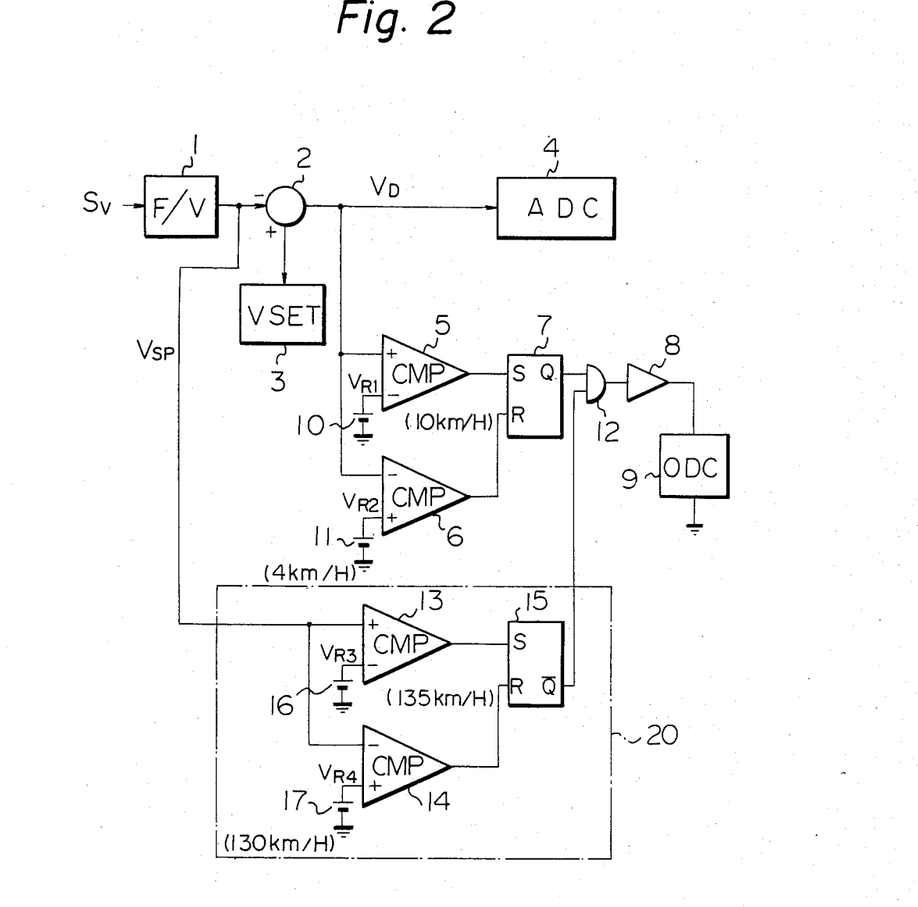
FIG. 2 is a schematic block circuit diagram illustrating an apparatus for controlling the speed of an automobile, which apparatus is an embodiment of the present invention.

FIG. 2 is a block diagram illustrating major portions of an apparatus which is an embodiment of the present invention. In the figure, the same reference numerals as those in FIG. 1 denote the same portions, as those in FIG. 1, 12 denotes an AND circuit, 13 and 14 denote comparators, 15 denotes a flip-flop circuit, 16 and 17 denote reference voltage sources, and 20 denotes an inhibition circuit. The signal $S_V$ corresponding to the actual speed is generated by a speed-detecting means (not shown) comprising, for example, a lead switch and a multi-pole disc magnet which rotates at a rotation speed proportional to that of the propeller shaft. The signal $S_V$ is converted by the frequency-to-voltage converter circuit 1 into voltages $V_{SP}$ proportional to the automobile speed. The voltage $V_{SP}$ from the frequency-to-voltage converter 1 is compared with reference voltages $V_{R3}$ and $V_{R4}$ by the comparators 13 and 14 in the inhibition circuit 20. If the reference voltage $V_{R3}$ generated by the reference voltage source 16 corresponds to a speed of 135 Km/h and the reference voltage $V_{R4}$ generated by the reference voltage source 17 corresponds to a speed of 130 Km/h, the comparator 13 produces a level "1" output to set the flip-flop circuit 15 when the automobile speed is greater than 135 Km/h, and the comparator 14 produces a level "1" output to reset the flip-flop circuit 15 when the automobile speed is less than 130 Km/h.

Therefore, when the automobile speed becomes greater than the preset speed of 135 Km/h, the inverted output $\bar{Q}$ of the flip-flop circuit 15 becomes "0", and the AND circuit 12 remains closed. Accordingly, even when the speed of an automobile running at a high speed is 10 Km/h less than the preset speed and the comparator 5 produces a level "1" output, causing the flip-flop circuit 7 to be set, the solenoid 9 is not energized to cut the overdrive. Namely, the gears are not shifted from fourth to third. In other words, cutoff of the overdrive is inhibited.

When the automobile speed becomes less than the preset value of 130 Km/h, the flip-flop circuit 15 is reset and the inverted output $\bar{Q}$ becomes "1". In this condition, if the flip-flop circuit 7 is set, the solenoid 9 is energized to cut the overdrive, and the gears are shifted from fourth to third. As the automobile speed reaches a speed which is 4 Km/h less than the preset speed, the comparator 6 produces a level "1" output to reset the flip-flop circuit 7. Hence, the solenoid 9 is de-energized, and the gears are again shifted from third to fourth so that the automobile constantly runs at the preset speed.

The above-mentioned reference voltages $V_{R1}$, $V_{R2}$, $V_{R3}$, and $V_{R4}$ are only illustrative and can be changed to voltages corresponding to any other speed, as a matter of course. Further, the control mechanism employing the solenoid 9 for cutting the overdrive may be constructed in a variety of known ways. Moreover, the speed-setting unit 3 includes a setup which enables a well-known incremental setting, i.e., manual acceleration.

As is described above, the embodiment of FIG. 2 deals with an apparatus for controlling the speed of an automobile, wherein the automobile engine is controlled so that it constantly runs at a preset speed, the overdrive is cut off by energizing the solenoid 9 when the automobile speed becomes a predetermined speed, for example, 10 Km/h, less than the preset speed, such as when the automobile is running on an uphill grade, and when the automobile speed approaches a speed close to the preset speed, for instance, a speed which is 4 Km/h less than the preset speed, the solenoid 9 is de-energized so that overdrive is resumed and wherein there is provided an inhibition circuit which inhibits the overdrive from being cut off when the automobile is running at a speed higher than, for example, 135 Km/h and which keeps the automobile in overdrive until the automobile speed becomes less than a given value, for example, less than 130 Km/h. When the automobile is running at a high speed, therefore, the gears are not shifted from fourth gear to third, with the result that the engine does not run at an excessively high speed. Accordingly, the apparatus of the present invention enhances the safety of an automobile when it is running at a high speed.

Figure 3:
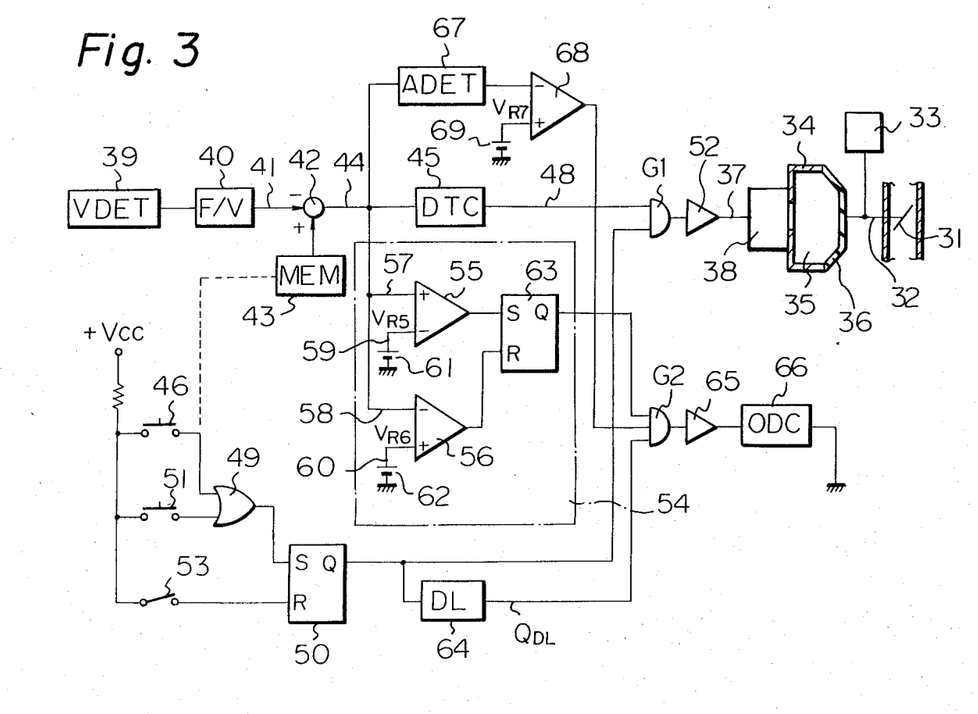
FIG. 3 is a block circuit diagram illustrating an apparatus for controlling the speed of an automobile, which apparatus is another embodiment of the present invention.

FIG. 3 is a block diagram which illustrates another embodiment of the present invention. Fuel is supplied to an internal-combustion engine (not shown) via a throttle valve 31. The power produced by the internal-combustion engine is transmitted to the wheels via the transmission. The throttle valve 31 is coupled to the accelerator 33 via a link 32 and to a diaphragm 36, made of a material such as rubber, which defines the operation chamber 35 of an actuator 34. An electromagnetic valve 38 is coupled to the operation chamber 35. The electromagnetic valve 38 communicates the operation chamber 35 with a source of negative pressure, such as an intake manifold, when the line 37 assumes a high potential level and sets the pressure in the operation chamber 35 so that it is equal to the atmospheric pressure when the line 37 assumes a low potential level. The actual speed of the automobile is detected by an automobile speed detector circuit 39, which sends automobile speed signals, consisting of a train of pulses having a frequency proportional to the actual speed, to a frequency-to-voltage converter circuit 40. The frequency-to-voltage converter circuit 40 sends an output to a subtractor 42 via a line 41. A memory 43 stores a preset speed and an output from the memory 43 is supplied to the subtractor 42, which produces a voltage signal corresponding to the speed difference (the preset speed minus the actual speed) that is sent to a duty control circuit 45 via a line 44. When a set switch 46 is manipulated while the automobile is running, the output from the frequency-to-voltage converter circuit 40 corresponding to the actual speed is stored in the memory $V_{43}$. The duty control circuit 45 sends a signal which has a duty cycle corresponding to the speed difference to a line 48. Therefore, the degree of opening of the throttle valve 31 increases with an increase in the absolute value of the negative pressure in the operation chamber 35 and decreases as the pressure in the operation chamber 35 approaches atmospheric pressure, with the result that the actual speed approaches the preset speed, and thereby a constant running speed is achieved. The output from the set switch 46 sets a flip-flop circuit 50 via an OR gate 49. The output from a resume switch 51 also sets the flip-flop circuit 50 via the OR gate 49. The output Q of the flip-flop circuit 50 is sent to one input terminal of an AND gate G1. The signal generated by the duty control circuit 45 is sent to another input terminal of the AND gate G1 via the line 48. The output of the AND gate G1 is sent to the line 37 via an amplifier 52. Thus, when the flip-flop circuit 50 is set, the signal of the duty control circuit 45 is sent to the electromagnetic valve 38 so that the automobile runs at a constant speed. When the brake and the clutch (not shown) are manipulated, a cancel switch 53 is closed, whereby the flip-flop circuit 50 is reset, and the output Q assumes a low level. The signal corresponding to the speed difference sent over the line 44 is applied to input terminals 57, 58 of comparator circuits 55, 56 in a speed-difference discrimination circuit 54. Another input terminal 59 of the comparator circuit 55 receives a reference voltage $V_{R5}$, generated by a reference voltage source 61, which corresponds to a speed difference $\Delta V1 = 10$ Km/h. Another input terminal 60 of the comparator circuit 56 receives a reference voltage $V_{R6}$, generated by a reference voltage source 62, which corresponds to a speed difference $\Delta V2 = 3$ Km/h. The output of the comparator circuit 55 sets a flip-flop circuit 63, and the output of the comparator circuit 56 resets the flip-flop circuit 63.

Figure 4:
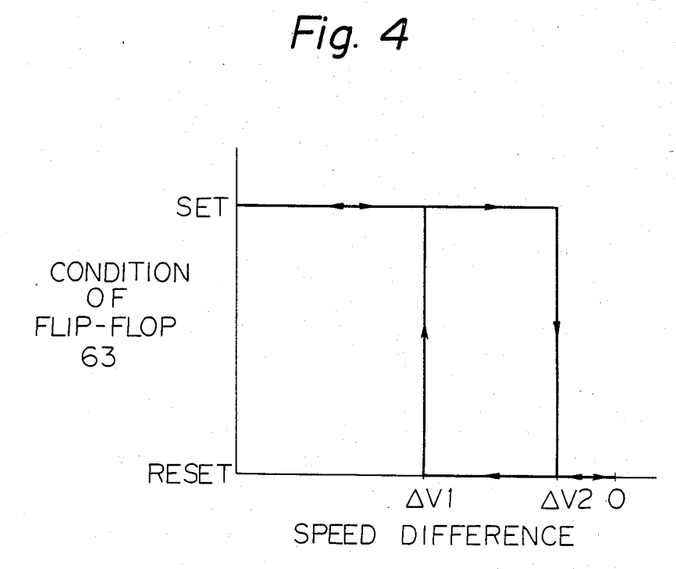
FIG. 4 is a graph illustrating the operation of a speed-difference discrimination circuit used in the apparatus of FIG. 3.

FIG. 4 is a graph which illustrates the operation of the speed-difference discrimination circuit 54. When the speed difference becomes greater than zero from the condition the automobile is running at a preset speed which is set in the memory 43 and when the speed difference reaches $\Delta V1$, the output of the comparator circuit 55 assumes a high level and sets the flip-flop circuit 63. When the speed difference is greater than $\Delta V2$ and approaches zero, the output of the comparator circuit 56 assumes a high level when the speed difference becomes $\Delta V2$ and the flip-flop circuit 63 is reset. The output Q of the flip-flop circuit 63 is sent to one input terminal of an AND gate G2, and the output Q of the flip-flop circuit 50 is sent to another input terminal of the AND gate G2 via a delay circuit 64.

Figure 5:
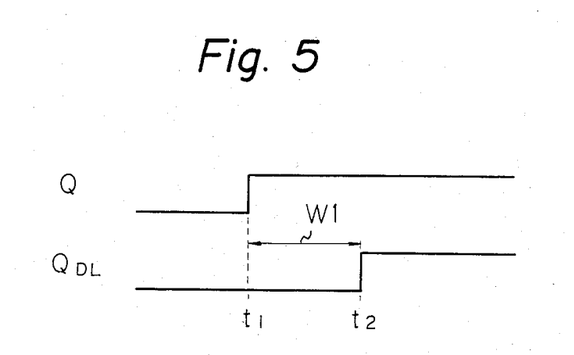
FIG. 5 is a wave form diagram illustrating the operation of a delay circuit used in the apparatus of FIG. 3.

FIG. 5 illustrates the operation of the delay circuit 64. If the output Q of the flip-flop circuit 50 changes from low to high at the time t1, shown in FIG. 5, the output $Q_{DL}$ of the delay circuit 64 changes from low to high at the time t2, a predetermined time W1 after the time t1. The time W1 may be one second. The output of the AND gate G2 is amplified by an amplifier circuit 65 and is sent to an electromagnetic solenoid 66 which works to cut the overdrive.

The signal which represents the speed difference and which is sent over the line 41 is also sent to an acceleration detector circuit 67 which comprises, for example, a differential circuit and which sends a voltage signal corresponding to the degree of acceleration to one input terminal of a comparator circuit 68 (FIG. 3). Another input terminal of the comparator circuit 68 receives a reference voltage $V_{R7}$, generated by a reference voltage source 69, which corresponds to a predetermined degree of acceleration. The comparator circuit 68 produces a signal having a low level when the degree of acceleration is greater than the degree of acceleration determined by the reference voltage source 69 and produces a signal having a high level when the degree of acceleration is less than the degree of acceleration determined by the reference voltage source 69. The output of the comparator circuit 68 is sent to another input terminal of the AND gate G2. When the speed set in the memory 43 is, for example, 80 Km/h and when the automobile is constantly running at the thus set speed, the flip-flop circuit 50 is in a set condition and the duty ratio of the electromagnetic valve 38 of the actuator 34 is controlled by the signals generated by the duty control circuit 45. The flip-flop circuit 50 is reset when the brake and/or the clutch are operated. Let it now be assumed that the accelerator is depressed so that the automobile runs at 60 Km/h. In this case, the speed difference is greater than $\Delta V1$, and the flip-flop circuit 63 is in a set condition and the flip-flop circuit 50 is in a reset condition. Therefore, the electromagnetic solenoid 66 is not energized, and the gears remain in high, or fourth.

When the automobile is manually operated by using the accelerator 33, the flip-flop circuit 50 is set if the resume switch is manipulated. Therefore, the signal is transferred from the duty control circuit 45 to the electromagnetic valve 38 via the AND gate G1. The flip-flop circuit 63 remains in a set condition during acceleration until the speed difference reaches $\Delta V2$. The output Q of the flip-flop circuit 50 is delayed by the delay circuit 64 and is transferred to the AND gate G2. Here, it is assumed that the degree of acceleration detected by the acceleration detector circuit 67 is less than the degree of acceleration which corresponds to the voltage determined by the reference voltage source 69, and, hence, the output of the comparator circuit 68 assumes a high level. If the driver removes his foot from the accelerator 33 simultaneous with operation of the resume switch 51, the engine brake is applied, in the condition that the automobile remains in fourth gear. Since the automobile remains in fourth speed, the effect of the engine brake is so small that the shock of deceleration is very small. During the time W1 of the delay circuit 64, the electromagnetic valve 38 is controlled by the output generated by the duty control circuit, whereby negative pressure is supplied to the operation chamber 35 with the automobile still being in fourth gear, and the throttle valve 31 is opened to accelerate the automobile. After the resume switch 51 is manipulated and after the time W1 has passed from the time the flip-flop circuit 50 was set, the delay circuit 64 sends a high-level signal $Q_{DL}$ to the AND gate G2, whereby the electromagnetic solenoid 66 is energized to cut the overdrive. Therefore, the gears are shifted to third which has a reduction ratio greater than that of fourth. The automobile therefore, is accelerated while remaining in third gear. Thus, when the resume switch 51 is operated, the reduction ratio remains unchanged for the time determined by the delay circuit 64 i.e., a small reduction ratio is maintained for a predetermined time. The automobile is accelerated at an increased reduction ratio after the predetermined time has passed. When the resume switch is manipulated, therefore, the automobile is smoothly accelerated.

When the degree of acceleration of the automobile is large, the output of the comparator circuit 68 remains at a low level, and the output generated by the AND gate G2 remains at a low level. Therefore, the electromagnetic solenoid 66 for cutting the overdrive remains de-energized, and the gears are prevented from shifting from fourth, which has a small reduction ratio, to third, which has a large reduction ratio. When the degree of acceleration is small, the output of the comparator circuit 68 assumes a high level, and the output of the AND gate G2 becomes high depending upon the output of the speed-difference discrimination circuit 54 and the output Q of the flip-flop circuit 50, with the result that the electromagnetic solenoid 66 is energized. Thus, the overdrive is cut only when the degree of acceleration is small and when it is necessary to cut the overdrive. Therefore, the automobile accelerates, when, for example, it is running on an uphill grade.

In the above-mentioned embodiments, the signal generated by the resume switch is delayed by a time predetermined by the delay circuit, and the gears are so shifted that the reduction ratio increases after the predetermined time has passed. When the resume switch is operated, therefore, the automobile can be accelerated without creating a feeling of deceleration, thereby making the ride more comfortable. Moreover, since the reduction ratio of the gears is increased only when the degree of acceleration is less than the predetermined degree, over acceleration can be avoided and the automobile runs smoothly.

FIGS. 6A through 6C and FIGS. 7A through 7C illustrate the structure and operation of an overdrive-cutting mechanism which is used in the above-mentioned apparatuses for controlling the speed of an automobile and which includes the overdrive-cutting solenoid 9 of FIG. 2 or the electromagnetic solenoid 66 of FIG. 3.

Figure 6A:
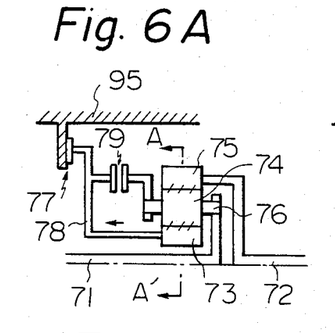
FIGS. 6A through 6C and FIGS. 7A through 7C are schematic diagrams illustrating the structure and operation of an overdrive-cutting mechanism used in the apparatuses of the present invention for controlling the speed of an automobile.
Figure 6B:
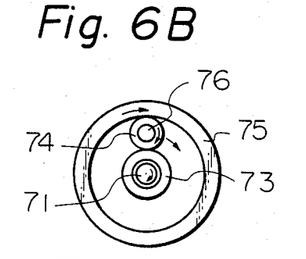

FIGS. 6A and 6B illustrate an overdrive gear unit which is set in overdrive.

The overdrive gear unit comprises an input shaft 71 which is mechanically connected to an engine shaft by a torque converter (not shown) and an output shaft 72 which is mechanically connected to a propeller shaft by a main transmission gear unit (not shown). The overdrive gear unit also comprises a sun gear 73, a pinion gear 74 which gears with the sun gear 73, and a ring gear 75 which gears with the pinion gear 74 and which is mechanically coupled to the output shaft 72. The pinion gear 74 is rotatable around a pinion gear shaft 76 which is connected to the input shaft 71. The overdrive gear unit further comprises an overdrive brake 77 mechanically connected to the sun gear 73 by a link member 78 and an overdrive clutch 79 mechanically connected between the link member 78 and the pinion gear shaft 76.

Figure 6C:
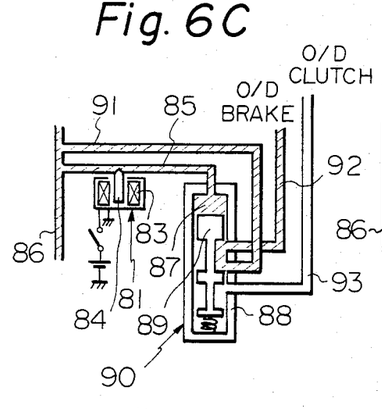

FIG. 6C illustrates an oil pressure system for actuating the overdrive brake 77 and the overdrive clutch 79. The oil pressure system comprises an overdrive-cutting solenoid 81 and a 3-4 shift valve 82. The overdrive-cutting solenoid 81 corresponds to the overdrive-cutting solenoid 9 of FIG. 2 or the electromagnetic solenoid 66 of FIG. 3 and comprises a coil 83 and an actuator 84 for closing a pipe 85 communicating a main pipeline 86 and a pressure room 87 of the 3-4 shift valve 82. The 3-4 shift valve 82 comprises a housing 88, a piston member 89, and a spring member 90. The housing 88 is communicated to the main pipeline 86 by a pipe 91, to the overdrive brake 77 by a pipe 92, and to the overdrive clutch 79 by a pipe 93.

In the above-mentioned overdrive-cutting system, when the overdrive solenoid 81 is not energized, the pipe 85 is almost closed so that oil filing the pressure room 87 does not escape to the main pipeline 86 and the piston member 89 is pressed downward against the force of the spring member 90 by the pressure of oil from the main pipeline 86. Consequently, the main pipeline 86 is communicated to the pipe 92 through the 3-4 shift valve 82 and the pipe 91 and the overdrive brake 77 is actuated, as shown in FIG. 6A. As a result, the sun gear 73 is mechanically clamped to a fixed base 95 and is rendered unrotatable. In this condition, when the input shaft 71 and the pinion gear shaft 76 rotate as one member, the output shaft 72 and the ring gear 75 are rotated by the pinion gear 74, and the reduction ratio of the overdrive gear unit becomes, for example 0.689.

Figure 7A:
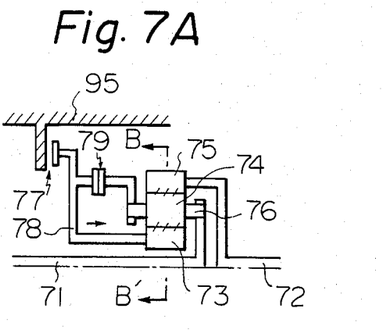
Figure 7B:
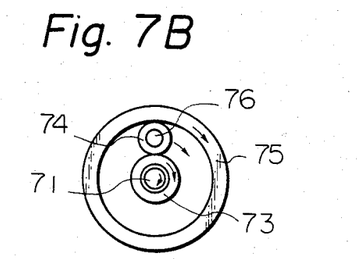
Figure 7C:
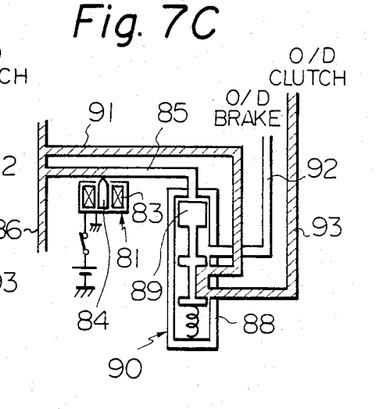

When the overdrive soleniod 81, is energized as shown in FIG. 7C, the actuator 84 thereof is pulled down into the coil 83 and the pipe 85 is not shut, with the result that oil in the pressure room 87 escapes to the main pipeline 86 and the piston member 89 is pressed upward by the force of the spring member 90. As a result, the main pipeline 86 is communicated to the pipe 93 by the 3-4 shift valve 82 and the overdrive clutch 79 is actuated, as shown in FIG. 7A. Consequently, the pinion gear shaft 76, the link member 78, and the sun gear 73 are mechanically joined. In this condition, when the input shaft 71 rotates, the pinion gear shaft 76, the pinion gear 74, the sun gear 73, and the ring gear 75 rotate together with the input shaft 71 as one body. Therefore, the reduction ratio of the overdrive gear unit becomes 1 and the overdrive is cut.

We claim:

1. In an automobile having transmission gears, wherein a reduction ratio establishes a relationship between said gears, an apparatus for controlling the speed of an automobile so that said automobile conforms with a preset speed when a resume switch is manipulated, said apparatus comprising:
   a speed-detecting means for generating a signal representing the actual speed of the automobile;
   a memory means for storing data corresponding to said preset speed;
   a speed-difference detecting means for detecting the difference between said preset speed and the actual speed of the automobile on the basis of said signal generated by said speed-detecting means and said data stored in said memory means;

a switching means for switching the reduction ratio of the gears on the basis of an output signal generated by said speed-difference detecting means; and a gating means for transferring said output signal generated by said speed-difference detecting means to said switching means, said switching means decreasing the reduction ratio when said actual speed approaches said preset speed and increasing the reduction ratio when said actual speed becomes a predetermined value less than said preset speed and when a speed related predetermined condition of the automobile is established.

2. An apparatus according to claim 1, wherein said predetermined condition is a condition in which said actual speed is less than a predetermined speed.

3. An apparatus according to claim 2, wherein said predetermined condition is determined by a comparison means which compares said signal generated by said speed-detecting means with reference signals corresponding to said predetermined speed.

4. An apparatus according to claim 3, wherein said comparison means comprises a first comparator for comparing said signal generated by said speed-detecting means with a first reference signal corresponding to a reference speed, a second comparator for comparing said signal generated by said speed-detecting means with a second reference signal corresponding to a speed which is less than said reference speed corresponding to said first reference signal, and a flip-flop circuit which is set by an output signal generated by said first comparator and reset by an output signal generated by said second comparator.

5. An apparatus according to claim 1, wherein said predetermined condition is a condition in which the degree of acceleration of the automobile is less than a predetermined degree of accelertion .

6. An apparatus according to claim 5, wherein said predetermined condition is determined by an acceleration-detecting circuit and a comparator for comparing an output signal, corresponding to the actual degree of acceleration, generated by said acceleration-detecting circuit and a reference signal corresponding to said predetermined degree of acceleration.

7. An apparatus according to claim 6, wherein said acceleration-detecting circuit comprises a differential circuit which generates said output signal corresponding to said actual degree of acceleration by differentiating said signal corresponding to said actual speed from said speed-detecting means.

8. An apparatus according to claim 6, wherein said acceleration-detecting circuit comprises a differential circuit which generates said output signal corresponding to said actual degree of acceleration by differentiating said output signal generated by said speed-difference detecting means.

9. An apparatus according to claim 5, wherein said predetermined condition includes a further condition in which a predetermined time period elapses after said resume switch is manipulated.

10. An apparatus according to claim 1, wherein said predetermined condition is a condition in which a predetermined time period elapses after said resume switch is manipulated.

11. An apparatus according to claim 10, wherein said predetermined condition is detected by using a delay circuit which delays a signal generated by said resume switch for said predetermined time period.

12. An apparatus according to claim 11, wherein said gating means is controlled by an output signal supplied from said delay circuit.

13. In an automobile having transmission gears wherein a reduction ratio establishes a relationship between said gears, an apparatus for controlling the speed of an automobile so that said automobile conforms with a preset speed when a resume switch is manipulated, said apparatus comprising:

speed-detecting means for generating a signal representing the actual speed of the automobile;

memory means for storing data corresponding to said preset speed;

speed-difference detecting means for detecting the difference between said preset speed and the actual speed of the automobile on the basis of said actual speed signal and said data stored in said memory means;

switching means for switching the reduction ratio of the gears on the basis of an output signal generated by said speed-difference detecting means;

gating means for transferring said output signal generated by said speed-difference detecting means to said switching means to cause said switching means to decrease the reduction ratio when said actual speed approaches said preset speed and to increase the reduction ratio when said actual speed becomes a predetermined value less than said preset speed and when a predetermined condition selected from at least one of the following conditions of the automobile is established:

(A) said actual speed is less than a predetermined speed;

(B) the degree of acceleration of said automobile is less than a predetermined degree of acceleration;

(C) a predetermined time period elapses after said resume switch is manipulated.

14. An apparatus according to claim 13, wherein said predetermined condition is said condition A.

15. An apparatus according to claim 14, wherein said gating means includes comparison means for determining said predetermined condition by comparing said actual speed signal with a reference signal corresponding to said predetermined speed.

16. An apparatus according to claim 15, wherein said comparison means comprises a first comparator for comparing said actual speed signal with a first reference signal corresponding to a reference speed, a second comparator for comparing said actual speed signal with a second reference signal corresponding to a speed which is less than said reference speed, and flip-flop circuit means responsive to output signals from said first and second comparators for actuating said switching means.

17. An apparatus according to claim 13, wherein said predetermined condition is said condition B.

18. An apparatus according to claim 17, further including acceleration-detecting means for detecting the actual degree of acceleration of said automobile and generating an acceleration signal which corresponds to said actual degree of acceleration, and for comparing said acceleration signal with a reference signal corresponding to said predetermined degree of acceleration.

19. An apparatus according to claim 18, wherein said acceleration-detecting means comprises a differential circuit which generates said acceleration signal by differentiating said actual speed signal.

20. An apparatus according to claim 18, wherein said acceleration-detecting means comprises a differential circuit which generates said acceleration signal by differentiating said output signal generated by said speed-difference detecting means.

21. An apparatus according to claim 13, wherein said predetermined condition is said condition C.

22. An apparatus according to claim 21, further including delay circuit means for delaying a signal generated by said resume switch for said predetermined time period.

23. An apparatus according to claim 22, wherein said gating means is controlled by an output signal supplied from said delay circuit.

24. An apparatus according to claim 13, wherein said predetermined condition includes said conditions B and C.

* * * * *